Patented Sept. 18, 1945

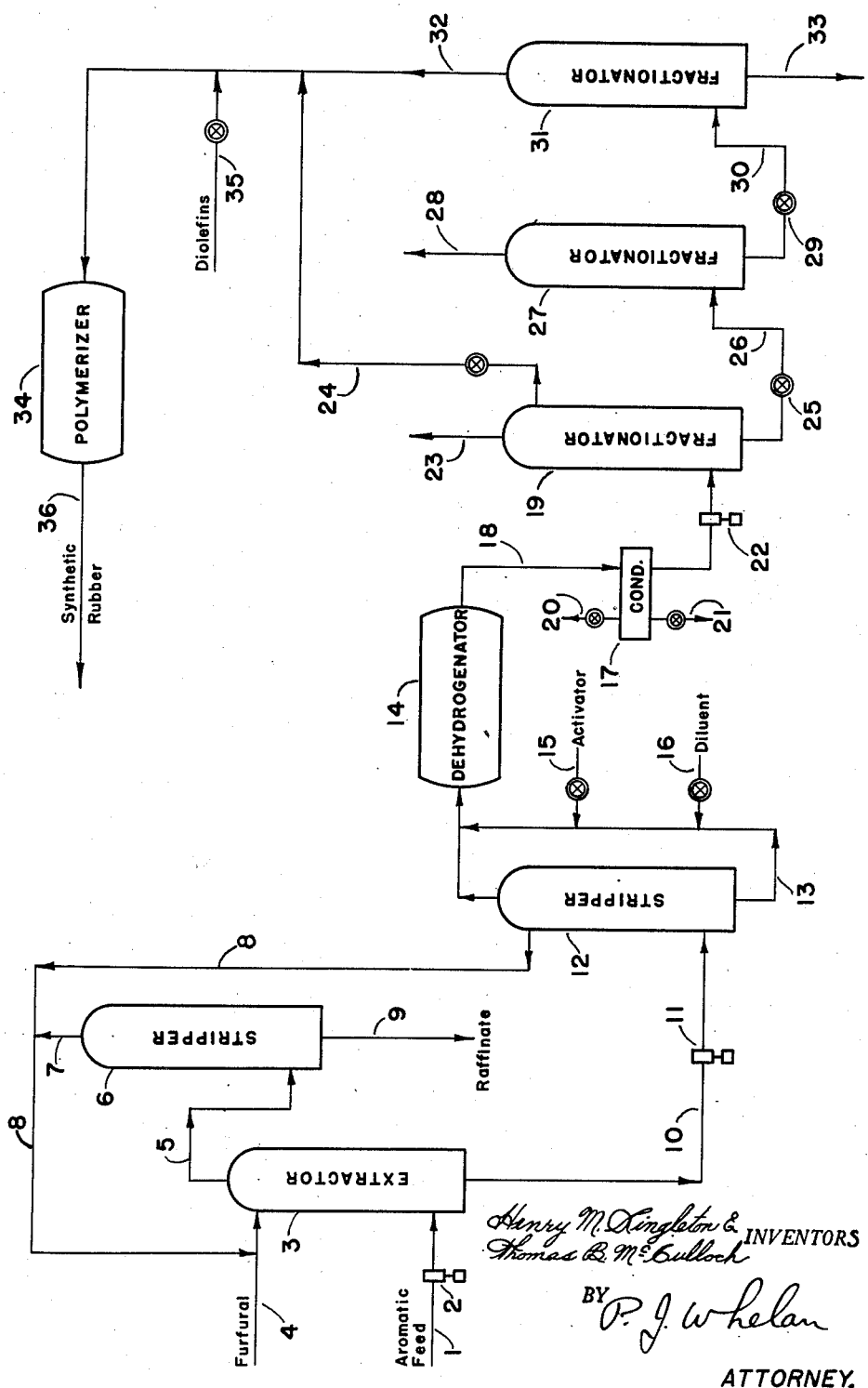

2,385,166

UNITED STATES PATENT OFFICE

2,385,166

PROCESS FOR THE PRODUCTION OF DIOLEFINS AND VINYL BENZENES

Henry M. Singleton, Goose Creek, and Thomas B. McCulloch, Baytown, Tex., assignors to Standard Oil Development Company, a corporation of Delaware Application February 15, 1943, Serial No. 475,868

7 Claims. (Cl. 260—669)

The present invention is directed to a method for producing raw materials for rubber manufacture. More particularly, it is concerned with a method for obtaining ethylbenzene, styrene, and the substituted styrenes as well as diolefins in a single continuous operation. In its more particular aspects, the invention is concerned with solvent extracting an aromatic feed stock and employing a portion of the solvent with the solvent extract as feed materials for producing the styrenes and diolefins.

As an example, this invention would have application in the production of styrene from a mixture of ethylbenzene and the xylenes. From a petroleum distillate boiling in the range of 250° to 350° F. an essentially pure aromatic fraction can be obtained by solvent extraction as is well known to the art; this aromatic fraction would contain the foregoing components. In order to illustrate the difficulty involved in separating ethylbenzene from these xylenes by distillation, the following boiling point characteristics are presented:

| Component | Boiling point, °F. |
|---|---|
| Ethylbenzene | 277 |
| p-Xylene | 280 |
| m-Xylene | 282 |
| o-Xylene | 291 |

Although the petroleum fraction separated in this foregoing manner would have an appreciable quantity of ethylbenzene, which is a desirable raw material for the production of styrene—an important ingredient of Buna S synthetic rubber, it has been economically unfeasible to convert the ethylbenzene to styrene in a pure enough form for use in rubber polymerization. The main difficulty has been found to be in the fact that by currently used processes for the dehydrogenation of ethylbenzene to styrene, comparatively low yields of styrene per pass are realized; thereby necessitating a recycle operation in order to convert substantially all of the ethylbenzene. When the xylenes are present in the ethylbenzene feed stock, the recycle stream build-up is too great for economical operation and a considerable portion of ethylbenzene must be discarded along with the xylenes, which undergo essentially no conversion in the dehydrogenation reactor. In the invention herein disclosed, an extraneous material is added which affects essentially complete conversion of the ethylbenzene in a single pass. The function of this added material is to serve as a hydrogen acceptor which promotes the dehydrogenation of ethylbenzene. This added material is furfural, a heterocyclic ring compound having a ring composed of an oxygen and 4 carbon atoms. The function of this hydrogen acceptor in dehydrogenation reactions is to (1) first undergo ring cleavage forming free radicals, then (2) accept hydrogen at the active points of the free radical from the hydrogen donor, ethylbenzene. In order to control the concentration of free radicals in the reaction mixture, it is specified that an acidic vapor be added to the feed. Specifically, these acidic vapors are hydrogen halides and hydrated oxides of nitrogen or sulfur in concentrations up to 50 weight per cent of the furfural contained in the feed. The amount of activator used will depend on the temperature employed and the degree of activity desired in the reaction mixture.

In the application of this invention to currently available feed stocks in refinery practice, furfural would be used for the purpose of concentrating the aromatics contained in the fraction boiling in the range of 250° to 350° F. The extraction of petroleum distillates for the production of essentially pure aromatic materials by the use of furfural is well known in the art. During the extraction stage, however, this invention provides for only partial removal of furfural from the aromatic extract. The extent to which the furfural is removed is dictated by the amount of furfural desired in the aromatic distillate charged to the dehydrogenation reactor.

The products from the dehydrogenation reactor can be separated into (1) light gas, (2) diolefin composed of butadiene and piperylene produced from furfural, (3) mixed aromatic fractions composed of benzene, toluene, and xylenes, and (4) styrene. The styrene and the light diolefins are produced in essentially pure form. To the recombined mixture of light diolefins and styrene an additional quantity of diolefins may be added in order to make the correct proportion of diolefin and styreen required for the interpolymerization of these materials for the production of a rubber-like material.

It is, therefore, an object of this invention to produce raw materials for synthetic rubber manufacture from a solvent extract which contains small amounts of the solvent being employed as a hydrogen acceptor during the processing operation.

Another object of the present invention is to produce in a single continuous operation a mixture of diolefins and styrenes suitable for rubber manufacture.

Other objects of the present invention will become apparent on reading the following detailed description of the accompanying drawing, in which—

The single figure is a front elevation in a diagrammatic form of a preferred embodiment of our invention.

Referring specifically to the drawing, an aromatic feed stock boiling between 250° and 350° F. is introduced into the system by means of line 1 and is pumped therethrough by pump 2 to extractor 3, wherein the feed hydrocarbon contacts, in a countercurrent manner, furfural. The furfural is injected into extractor 3 through line 4 from a source not shown and, in a manner well known in the art, it selectively concentrates the aromatics in the feed hydrocarbon stream. It is understood that extractor 3 comprises suitable contacting means; preferably extractor 3 in a countercurrent contacting tower of the bubble cap type.

A raffinate comprising essentially paraffinic and naphthenic hydrocarbons is withdrawn from extractor 3 by means of line 5 and is thence discharged into stripper 6 wherein by adjustment of temperature and pressure, a fraction containing the furfural is distilled therefrom and is removed from the stripper by means of line 7 for recycling to the incoming solvent feed through line 8 connecting to furfural feed line 4. The raffinate, free of solvent, is discharged from stripper 6 by means of line 9 and then may be further handled or treated as desired.

Solvent extract is discharged from extractor 3 through line 10 and is pumped by means of pump 11 to extract stripper 12. In extract stripper 12 only a portion of the furfural is removed as a sidestream. The portion of solvent removed from the extract in stripper 12 is recycled to furfural feed line 4 by means of line 8 as has been described with reference to stripper 6. The extract, recovered as overhead and as bottoms, is then passed to the dehydrogenator 14.

The amount of solvent remaining in the extract is so proportioned that the ratio of solvent to extract is in the range of at least 1 mole of furfural to 4 moles of ethylbenzene or other substituted benzenes contained in the extract. This can easily be accomplished in a manner well known to the art by adjustment of temperatures and pressures in extract stripper 12.

The extract containing proportioned amounts of furfural is discharged from extract stripper 12 by means of line 13 and is injected thereby into dehydrogenator 14. Along with the solvent extract containing furfural injected into dehydrogenator 14, are quantities of an activator agent and a diluent. The activating agent has been described in the foregoing description, but for completeness it is understood that it should be an acidic vapor, such as hydrogen chloride or the vapors of nitric acid and the like. The activator is injected into line 13 by means of line 15 from a source not shown, while the diluent is injected into line 13 through line 16. It is understood that the diluent may be an inert gas, such as natural gas or steam.

Dehydrogenator 14 is illustrated by a single rectangle, but it is understood that it will comprise all suitable equipment necessary in the process of removing hydrogen from the hydrocarbon and furfural molecules. The conditions to be employed in dehydrogenator 14 are such that substantially all the ethylbenzene and the furfural contained therein is converted to styrene and the diolefins in a single pass. In general, temperatures in the range of about 800° F. to about 1400° F. will be suitable. Good results may be obtained with temperatures from about 1150° F. to about 1275° F. Pressures in dehydrogenator 14 in general should not exceed 250 lbs. per sq. in. Under most conditions encountered, pressures of about 30 lbs. per sq. in. will be suitable.

The catalysts employed in dehydrogenator 14 are those dehydrogenation catalysts which are well known in the art. Suitable catalysts are referred to in U. S. Patent No. 2,126,817. A dehydrogenation catalyst containing a splitting component, such as, copper or other free metal, is often useful. In some cases a catalyst will not be necessary. Whether or not a catalyst is employed will depend upon the degree of activation desired for the hydrogen acceptor. It is understood that this activation will vary depending upon the amount of acceptor in the feed and on the aromatic hydrocarbon being dehydrogenated.

The dehydrogenated product is discharged from dehydrogenator 14 into separator or condenser 17 by means of line 18, which in turn connects with fractionator 19. In cases where inert gas is injected as a diluent, gases will be withdrawn from separator 17 through line 20. In those other cases when steam is used, separator 17 will function as a condenser and water may be withdrawn by means of line 21. Pump 22 in line 18 is employed to maintain sufficient pressure on fractionator 19 so that separation between the gaseous hydrocarbons above the $C_4$ hydrocarbons and the heavier fractions is easily accomplished. By operating fractionator 19 under high pressures it is also possible to condense with cooling water the stream of diolefinic material leaving tower 19 by means of line 24. Heavier hydrocarbons are discharged from fractionator 19 into secondary fractionator 27 through reducing valve 25 located in line 26.

In some particular instances it may be desirable to withdraw a single stream overhead from fractionator 19 and to subject this stream to solvent extraction for concentration of diolefinic materials. When it is desired to operate in this particular manner, the streams leaving fractionator 19 by means of lines 23 and 24 would be taken off overhead through line 23 and routed to the solvent extractor. In this manner any diolefins which might be lost in the gases leaving fractionator 19 by line 23 would be recovered.

However, as described hereinbefore, the stabilized material withdrawn from fractionator 19 is discharged into fractionator 27 for separation of the benzene, etc. hydrocarbons from styrenes. The former are discharged overhead from fractionator 27 by means of line 28 and are withdrawn from the system for further treatment for recovery of benzene, toluene, and xylenes, which in turn may be used in aviation gasoline, or in the production of explosives. The substantially xylene-free material is then discharged from fractionator 27 through reducing valve 29 located in line 30, and is introduced thereby into tertiary fractionator 31. Fractionator 31 is provided with suitable means for operating under reduced pressure. In fractionator 31 conditions are adjusted for removal of styrene overhead through line 32 and for withdrawal of heavier hydrocarbons and polymer through line 33. The heavier hydrocarbons leaving fractionator 31 by means of line 33 may be further processed for the recovery of methylstyrene and other valuable hydrocarbons contained therein. The styrene removed from tower 31 by means of line 32 combines with the diolefins distilled from fractionator 19 and the combined stream then discharges into polymerizer 34.

Provision is made for introduction of extraneous diolefins into line 32 since the amount of diolefins resulting from dehydrogenation of the furfural in dehydrogenator 14 usually is not in sufficient quantity to react with all of the styrene to produce a polymer having the qualities of rubber. In the cases where extraneous diolefins are needed they may be injected into line 32 through line 35. The diolefins should preferably constitute at least 80% of the mixed feed to the polymerizer.

In polymerizer 34 the conditions for polymerizing the diolefins and the styrenes are those well known in the art. In general, the diolefin is polymerized with the styrene in an emulsion containing as a catalyst a sulfur-bearing compound and some emulsifying agent so that intimate contact between the reactants is maintained. However, polymerization per se does not form part of this invention; therefore, the conditions will not be described in any detail.

As an end product of this invention a polymer having rubbery characteristics is discharged from polymerizer 34 by means of line 36 for use as a substitute wherever rubber had been used heretofore.

Although not forming a part of the present invention, it may be desirable, in order to secure maximum purity of the aromatic product, to inject with the aromatic feed introduced into the system by means of line 1, a paraffinic wash oil which allows substantially complete separation between the paraffinic hydrocarbons and the desired aromatic hydrocarbons. When a wash oil is injected into the system, it will be necessary to provide a wash oil fractionating tower for removal and recovery of the wash oil for reuse in the process. This tower ordinarily will be located in line 13 ahead of the injection of diluent.

Mention has been made in the specification of the use of certain acidic constituents as activators. It is within the spirit and scope of the present invention to also employ stabilizing agents for stabilization of the furan ring of the furfural when it is desired to control the reaction so that free radical formation is inhibited. When this is desired, basic vapors such as pyridine and other nitrogen bases may be employed. It will only be necessary to add the basic material when operating at the higher temperature levels and when limited conversion of the furan ring is desired. The amount of the stabilizers employed should not exceed 50% of the amount of furfural left in the extract.

The nature and objects of the present invention having been fully described and illustrated, what we wish to claim as new and useful and to secure by Letters Patent is:

1. A process for the production of raw materials for rubber manufacture which comprises the steps of extracting an aromatic hydrocarbon fraction containing alkylated benzenes with a liquid solvent comprising a heterocyclic compound of the furan series to obtain a raffinate and an extract, separating said raffinate from the extract phase, removing a portion of the solvent from said extract and then subjecting the extract containing small amounts of the solvent to dehydrogenation conditions to produce diolefins and vinyl benzene.

2. A process in accordance with claim 1 in which the furan derivative is furfural.

3. A process in accordance with claim 1 in which the aromatic feed hydrocarbon fraction boils between 250° and 350° F.

4. A process for the production of diolefins and vinyl benzenes which comprises extracting an aromatic hydrocarbon fraction boiling between about 250° and 350° F. and containing alkylated benzenes with furfural to obtain a raffinate and an extract phase, removing said raffinate phase, stripping a portion of the furfural from the extract phase and recycling the stripped furfural to the extraction stage, dehydrogenating the extract phase containing furfural while adding an activating agent and a diluent thereto and recovering from the products of dehydrogenation diolefins and vinyl benzene.

5. A process for the production of diolefins and vinyl benzenes which comprises extracting an aromatic hydrocarbon fraction containing alkylated benzenes with furfural to obtain a raffinate and an extract phase, separating said extract phase from said raffinate phase, partially stripping said extract phase so that the mole ratio of furfurl to hydrocarbons of the homologous series beginning with ethylbenzene is at least 1:4, subjecting said partially stripped extract phase to dehydrogenation conditions and separately recovering, by fractional distillation of the dehydrogenated product, diolefins and styrene.

6. A process in accordance with claim 5 in which an acidic activator is added to the partially stripped extract phase.

7. A method for producing styrene from an aromatic fraction containing ethylbenzene in combination with xylenes which comprises adding to the fraction an organic compound of the furan series, subjecting the resulting mixture to conditions suitable for the dehydrogenation of the hydrocarbons, and recovering styrene from the dehydrogenation products.

HENRY M. SINGLETON.
THOMAS B. McCULLOCH.